No. 864,046. PATENTED AUG. 20, 1907.
Z. L. TRAINHAM.
KITCHEN UTENSIL.
APPLICATION FILED NOV. 21, 1906.
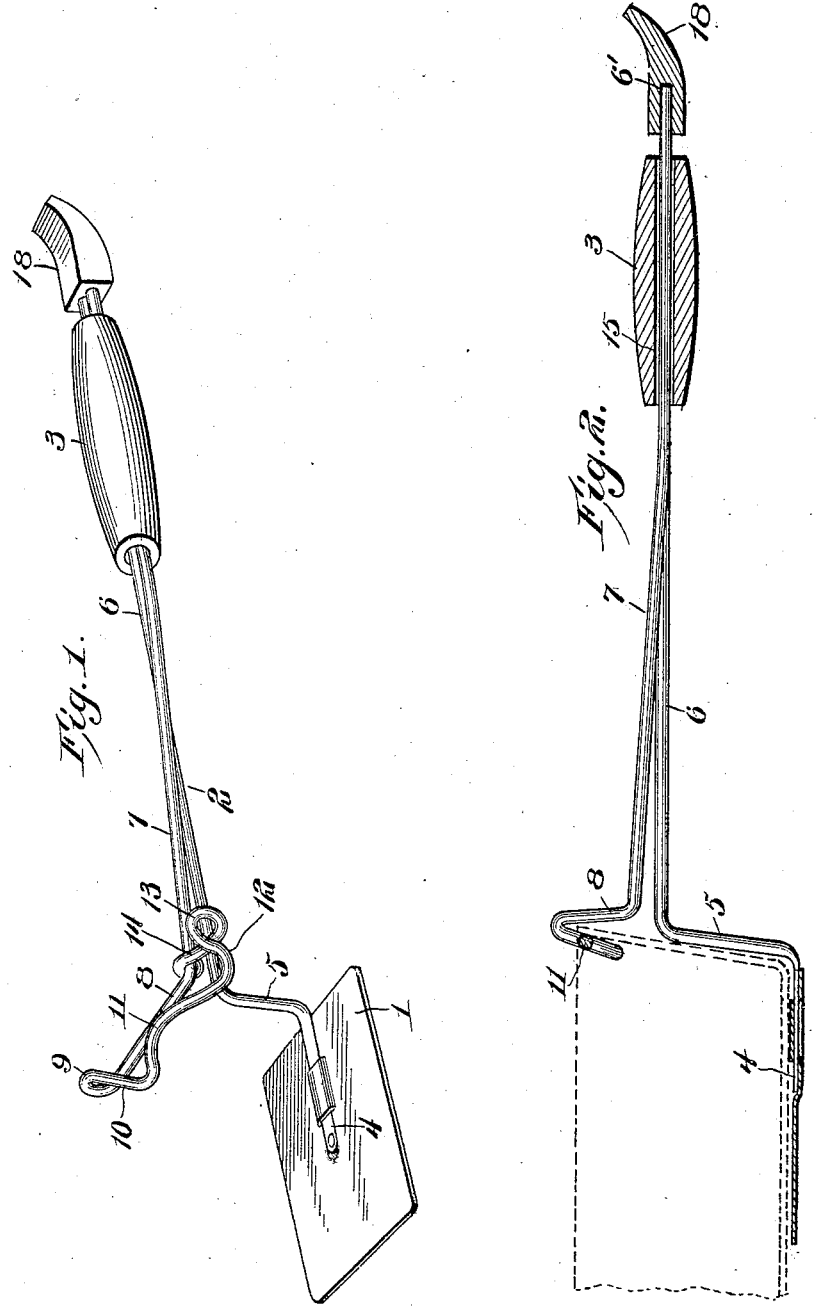
Witnesses
Louis R. Heinrichs
K. Allen.
Inventor
Zachariah L. Trainham
By
Victor J. Evans Attorney
THE NORRIS PETERS CO., WASHINGTON, D. C.

UNITED STATES PATENT OFFICE.

ZACHARIAH L. TRAINHAM, OF RICHMOND, VIRGINIA, ASSIGNOR OF ONE-THIRD TO O. F. SUTTON, OF RICHMOND, VIRGINIA.

KITCHEN UTENSIL.

No. 864,046.   Specification of Letters Patent.   Patented Aug. 20, 1907.

Application filed November 21, 1906. Serial No. 344,505.

*To all whom it may concern:*

Be it known that I, ZACHARIAH L. TRAINHAM, a citizen of the United States, residing at Richmond, in the county of Henrico and State of Virginia, have invented new and useful Improvements in Kitchen Utensils, of which the following is a specification.

The invention relates to an improvement in kitchen utensils, comprehending specifically a single implement designed for use as a cake turner, pot and pan lifter, and stove lid lifter.

The main object of the invention is the production of an implement constructed mainly of wire and so formed as to adapt it for convenient use as a cake turner, or pot and pan lifter.

The invention, in the preferred form will be described in the following specification, reference being had particularly to the accompanying drawings, in which:—

Figure 1 is a perspective view of the implement. Fig. 2 is a view in elevation partly in section, illustrating its application to a pan.

Referring particularly to the drawings, the improved implement comprises a plate 1, a lifting member 2, and a handle 3. The plate is preferably a thin metallic body of a size and shape convenient for use as a cake turner. The lifting member is preferably formed of a single length of wire terminally secured to the plate 1, as at 4, projected therefrom at right angles to the plane of the plate for a short length as at 5, and then projected at right angles to the portion 5 in parallel relation to the plane of the plate to provide a lifting bar 6. The material is then formed into a return bend at 6', and projected in proximity to the lifting bar 6 to form a second lifting bar 7. The lifting bar 7 is terminally formed to provide a clamp member designed to coöperate with the plate 1 in the use of the implement as a pan lifter. In forming the clamp member, the bar 7 is bent laterally to provide a rear clamping bar 8, said bar projecting upwardly at a slight inclination to the plane of the plate 1. At the end of the bar 8 the material is formed into a loop 9 from which said material is projecting forwardly and downwardly, as at 10, said portion 10 terminating approximately on a plane with the bar 7. From the lower terminal portion 10, the material is projected in upwardly curved form, as at 11, to a point equidistant from and on the opposite side of the bar 7 with respect to the portion 10, being there projected upwardly at 12 to correspond to the portion 10, bent into looped form at 14, to correspond to the loop 9 and projected from the loop 13 to provide a rear clamping bar 14, corresponding to the bar 8, the material being terminally coiled about or secured to the bar 7 at its juncture with the bar 8. As thus constructed, the bar 7 is terminally provided on each side with a rear clamping bar, each formed at the end with a loop, and the loops connected by a relatively forward curved bar lying in approximately parallel relation to the rear clamping bars 8 and 14.

The bar 7 at a point remote from the clamping member is bent in an upward direction to normally offset the bar 7 above and at a gradually increasing distance from the bar 6. The handle 3 of any exterior shape and preferably of non-heat conducting material is formed with a centrally arranged longitudinal opening 16 to receive both bars 6 and 7, the size of the openings 16 being such as to permit movement of the handle longitudinally of the bars 6 and 7. A lid-lifting point 18 is secured upon the lifting member at the return bend 6, said lid-lifter serving, in addition to the lid-lifting function, to provide a limit for the rearward movement of the handle 3.

In use as a cake turner, the lifting member, including the bars 6 and 7, serves as a handle for the plate 1, the latter being obviously used for turning the cake. In using the device as a pan-lifter, the plate 1 is inserted beneath the bottom of the pan and the clamping member arranged above the edge of the pan, said member being so disposed that the clamping bars 8 and 14 are on the outer surface of the rim of the pan, while the sections 10 and 12 and the bar 11 are on the inner side. The handle 3 is now moved forward, causing the bars 6 and 7 to be forced together, thereby forcing the clamping member on to the rim of the pan, the movement being continued until said rim fits snugly within the loops 9 and 13. In this position of the parts, the pan or pot may be readily lifted without liability of burning the fingers or of disconnection of the pan from the implement, it being noted that the handle 3 serves as a holding means to secure such relative position of the clamping member and plate 1 as will prevent escape of the article held thereby.

The device is constructed of substantial material to permit its use with the usual kitchen utensils and preferring that the lifting member be constructed wholly of a single length of wire, it is to be understood that the same is not absolutely essential and that said member may be constructed of any material desired.

It is to be particularly noted in connection with the above device that the projection of the portions 10 and 12 from the loop members extend forwardly and downwardly from the respective clamping bars 8 and 14. This construction reduces the distance between the sections 10 and 12 and said bars 8 and 14 toward the upper end of the loop, so that in the use of the implement as a pan-lifter, the rim of the pan is securely clamped between the sections 10 and 12 and the extreme ends of the clamping bars 8 and 14.

Having thus described the invention, which I claim is:—

A kitchen implement comprising a plate, a lifting member, and a handle member, said lifting member being constructed of a single length of wire terminally secured to the plate and projected therefrom to form a lifting bar, then formed in a return bend upon itself and projected forward to form a second lifting bar, said second bar being projected at an incline to the plane of the first lifting bar, the material at the end of the second lifting bar being bent into the form of a loop or jaw adapted to engage the rim of a vessel, the handle being formed with a central longitudinally arranged opening to embrace both lifting bars and slidable thereon to move the jaw nearer to the plate.

In testimony whereof, I affix my signature in presence of two witnesses.

ZACHARIAH L. TRAINHAM.

Witnesses:
O. F. SUTTON,
J. M. DELANY.